US005970784A

United States Patent [19]

Genin

[11] Patent Number: 5,970,784

[45] Date of Patent: Oct. 26, 1999

[54] METHOD FOR IDENTIFYING THE CYLINDER PHASE OF AN INTERNAL COMBUSTION MULTI-CYLINDER FOUR STROKE ENGINE

[75] Inventor: Christophe Genin, Noisiel, France

[73] Assignee: Magneti Marelli France, Nanterre Cedex, France

[21] Appl. No.: 08/945,884

[22] PCT Filed: May 13, 1996

[86] PCT No.: PCT/FR96/00725

§ 371 Date: Dec. 31, 1997

§ 102(e) Date: Dec. 31, 1997

[87] PCT Pub. No.: WO96/36803

PCT Pub. Date: Nov. 21, 1996

[30] Foreign Application Priority Data

May 15, 1995 [FR] France .................................. 95 05711

[51] Int. Cl.[6] .................................................. G01M 15/00

[52] U.S. Cl. ........................................... 73/117.3; 340/441

[58] Field of Search .................................. 73/116, 117.3, 73/112, 113, 117.2; 701/1; 123/481; 340/439, 441

[56] References Cited

U.S. PATENT DOCUMENTS

| | | | |
|---|---|---|---|
| 4,989,448 | 2/1991 | Fukui et al. | 73/116 |
| 5,196,844 | 3/1993 | Tomisawa et al. | 73/117.3 |
| 5,321,979 | 6/1994 | McKendry et al. | 73/117.3 |
| 5,402,675 | 4/1995 | Entenmann et al. | 73/117.3 |
| 5,554,802 | 9/1996 | Fukui et al. | 73/117.3 |
| 5,562,082 | 10/1996 | Norppa et al. | 123/424 |
| 5,613,473 | 3/1997 | Angermaier | 123/481 |
| 5,703,283 | 12/1997 | McClish et al. | 73/116 |
| 5,715,780 | 2/1998 | Haller | 73/117.3 |
| 5,756,888 | 5/1998 | Marquez-Escoto | 73/116 |

FOREIGN PATENT DOCUMENTS

| | | |
|---|---|---|
| 0 177 145 | 9/1984 | European Pat. Off. . |
| 0 204 220 | 6/1985 | European Pat. Off. . |
| 0 532 419 | 9/1991 | European Pat. Off. . |
| 0 640 762 | 8/1993 | European Pat. Off. . |
| 2 692 623 | 6/1992 | France . |

*Primary Examiner*—Eric S. McCall
*Attorney, Agent, or Firm*—Henderson & Sturm

[57] ABSTRACT

Method for identifying cylinder phase in an engine with an ignition and/or injection system wherein each cylinder is individually controlled, and with a sensor cooperating with a rotary target having an indexing element indicating a reference cylinder upper dead center position. The method including the steps of generating, on the reference cylinder, a disturbance other than the interruption of the injection, the disturbance of a type capable of causing a change in the engine torque, detecting the engine torque change by a change in a signal representative of the gas torque, caused by the generation of the disturbance, establishing a relationship between the time of generation and the detection of its result on the engine torque so as to derive the reference cylinder phase at the time of generation of the disturbance, and thereafter the phase of the other cylinders. The method of the present invention being particularly useful for four stroke engines with sequential ignition and/or injection.

9 Claims, 2 Drawing Sheets

METHOD FOR IDENTIFYING THE CYLINDER PHASE OF AN INTERNAL COMBUSTION MULTI-CYLINDER FOUR STROKE ENGINE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention relates to a method for recognizing or identifying the phase of the cylinders of a multi-cylinder four-stroke internal combustion engine, of the type equipped with an ignition system and/or fuel injection system controlled individually for each cylinder, and comprising a sensor, often called the crank angle sensor, which is fixed with respect to the engine and detects the movement past it of at least one position mark fixed on a rotary target which rotates integrally with the engine crankshaft, to supply a signal indicating the passage of the piston of a reference cylinder of the engine through a determined position, for example approximately 100° crank angle before top dead center (TDC) for this piston.

2. Description of the Prior Art

To optimize the operation of a four-stroke internal combustion engine, particularly for controlling a sequential ignition system and/or a sequential multi-point fuel injection system of such an engine correctly, it is known that the phase of the cylinders of the engine needs to be identified or recognized, that is to say that at every moment during an engine cycle it is necessary to know the position of each of the various pistons of the engine as well as which phase or stroke of the engine cycle each of the various cylinders of this engine is performing, and in particular the passage of the pistons through the TDC position at the beginning of the induction phase, so that the moment at which fuel is to be injected can be defined with precision, and their passage through the TDC position at the beginning of the combustion-expansion phase, so that ignition (the moment and energy of ignition) can be defined with precision if the internal combustion engine is a controlled-ignition engine.

In effect, in an electronic and multi-point fuel injection system, which comprises at least one injector per cylinder for injecting metered amounts of fuel just upstream of the corresponding inlet valve or valves, and in which the injectors are operated periodically and at least once per engine cycle, sequential injection consists in operating the various injectors in turn and in a given order, so that the metered amounts of fuel can be injected toward the cylinders in the most favorable conditions relative to the corresponding induction phases. Likewise, a sequential ignition system allows ignition to be commanded in turn and in a given order in the various cylinders under the best conditions with respect to the corresponding combustion-expansion phases, that is to say, in practical terms, with an appropriate ignition advance, with respect to TDC, at the beginning of the corresponding combustion-expansion phase, as a function of the operating conditions of the engine, and does so without simultaneously causing an unnecessary and sometimes disturbing spark in another cylinder which is performing an engine stroke ill-suited to being fired.

Ignition systems and/or fuel injection systems of the sequential type for internal combustion engines generally comprise an engine control computer, which in particular manages ignition and fuel injection and which must, for this, always know which phase the cylinders are in so that it can precisely monitor the way in which the engine cycle is occurring in each of these cylinders so that the engine control computer can calculate and command the amount of fuel delivered by each injector, that is to say in actual fact the injection period, starting from a determined moment, on the one hand, and so that the engine control computer can calculate the moment of ignition and trigger it by commanding a corresponding ignition coil, on the other hand.

On a rotating target, that rotates integrally with the engine crankshaft or flywheel, and generally consists of a ring gear whose teeth, distributed about the periphery of the ring, constitute marks for measuring the rotational speed of the engine and the position of the crankshaft, by traveling past a sensor, for example a variable-reluctance sensor fixed on the engine, it is known to position at least one position mark which for example consists of a tooth and/or a gap which has a different width from the others, so that it forms a unique feature that can be distinguished from the other teeth and/or spaces which are uniformly distributed, so that regions with an angular position that correspond to a determined phase in the stroke of the pistons can be identified on the ring gear. By moving past the fixed sensor, the position mark generates a distinctive signal each time the pistons of the engine pass through a known fixed position, and this allows the engine control computer to calculate, among other things, the moments at which the various pistons pass through top dead center.

However, in a four-stroke internal combustion engine, one engine cycle corresponds to two revolutions of the crankshaft, which means that the piston of the reference cylinder during each engine cycle passes through TDC twice, but during two different phases of the engine cycle.

In particular, for engines with four in-line cylinders, numbered in turn from 1 to 4 from one end of the engine block to the other, the firing order for the cylinders is generally given by the sequence 1, 3, 4, 2 and the pistons of cylinders 1 and 4 pass simultaneously through top dead center alternately, one at the beginning of an induction phase and the other at the beginning of a combustion-expansion phase, while the pistons of cylinders 2 and 3 also pass simultaneously through TDC with a phase shift of half of an engine revolution as compared with cylinders 1 and 4, and like the latter cylinders alternately at the beginning of an induction phase and at the beginning of a combustion-expansion phase.

In consequence, it is known that it is not possible simultaneously to obtain information regarding the angular position and information regarding the phase of the various pistons of a four-stroke engine just using the signals resulting from the passage of position marks on a ring gear driven with the crankshaft past a sensor fixed on the engine, that is to say just from the signals given by a crank angle sensor which usually is also an engine speed sensor.

For appropriate control of a sequential ignition and/or sequential injection system, it is known to make use of additional information relating to the phase of the cylinders and which is given by a second sensor, possibly of the same type as the first one, for example a variable-reluctance sensor, and which is sensitive to the movement past it of marks, such as teeth, borne by a second rotary target, such as a ring gear driven in rotation at a speed which is half that of the crankshaft, so that this second target makes one full revolution per engine cycle. For this, it is known to make the second target rotate integrally with the distributor rotor shaft or, more frequently, the camshaft or its drive pulley. It is especially known for the second rotary target, driven with the camshaft, to bear a single position mark which interacts with the second sensor to deliver a signal that has two logic levels.

Thus, the interaction of the first sensor with the first rotary target gives the information on the angular position of the piston of a reference cylinder, while the interaction of the second sensor and the second target gives the information regarding the phase of this reference cylinder, for which reason the assembly formed by the second sensor and the second rotary target is generally dubbed engine-phase sensor.

However, the presence of two sensors and two rotary targets is a factor in increasing the cost and the size and the complexity of assembly.

In order to overcome these drawbacks, FR-A-2 692 623 proposes a method for identifying the cylinders which saves on having to have an engine phase sensor and replaces it with an analysis of engine torque, in order to detect misfires that are the result of a command to stop injecting fuel into a reference cylinder as the piston of this cylinder passes through TDC.

More specifically, this method for producing a signal for identifying the cylinders, comprises the following steps:

- stopping injecting fuel for a given reference cylinder of the engine at a precise moment and for a precise length of time;
- observing, using the signal for detecting misfires, the occurrence of a misfire in the reference cylinder following the non-injection and the moment that the misfire is detected;
- calculating the number of TDCs separating the moment that injection is stopped in the reference cylinder and the moment the misfire resulting from this stoppage is detected, and identifying by deducing the moment of passage through TDC whether the reference cylinder is an induction or a power stroke; and
- formulating the cylinder identification signal, this signal, which is in phase with the TDC signal, being reset at the moment that the reference cylinder passes through TDC on an induction or power stroke and taking up the successive order of combustion in the cylinders.

This method does however have the drawback that to use it assumes the presence not only of a crank angle sensor, for identifying the passage through TDC of the piston of a reference cylinder, but also of a system for detecting misfires, capable of supplying a signal allowing misfires that occur in the various cylinders to be identified.

Another drawback with this method is that it can only be used on an engine that is equipped with a fuel injection system controlled individually per cylinder, which means that it cannot be used on an engine equipped, for example, with a mono-point fuel injection system and a sequential ignition system.

The problem underlying the invention is that of overcoming the drawbacks of the method known from FR-A-2 692 623 and of proposing a method of recognizing the phase of the cylinders which can be employed on an engine that is equipped with a crank angle sensor, without a phase sensor or a system for detecting misfires, it being possible for the engine to have a fuel injection system that is controlled individually and/or an ignition system that is controlled individually per cylinder. Thus the method of recognizing the phase of the cylinders according to the invention can be used whether the ignition is sequential and with any kind of injection, for example mono-point, multi-point "full-group" (i.e. simultaneous injection into all cylinders) or semi-sequential, symmetric or semi-sequential asymmetric, or sequential and phased or alternatively sequential and unphased, or whether the injection is multi-point sequential and with any kind of ignition, for example static or twin static (that is to say producing sparks in two cylinders simultaneously for each engine half revolution).

BRIEF SUMMARY OF THE INVENTION

For this, the method according to the invention, for recognizing the phase of the cylinders of a multi-cylinder four-stroke internal combustion engine equipped with an ignition system and/or fuel injection system controlled individually for each cylinder, and comprising a sensor to supply a signal making it possible to identify that the piston of a reference cylinder of the engine is passing through a determined position, is characterized in that it comprises at least one cycle of the steps that consist:

- in commanding, on said reference cylinder and at a given moment that is associated with said piston of the reference cylinder passing through said determined position, a disturbance other than complete stoppage of command for the injection of fuel, and liable to cause variation in the engine torque,
- in observing the engine torque and detecting a possible variation in engine torque as a result of said command for disturbance on said reference cylinder, and in detecting the moment at which said variation in engine torque occurs or the absence of variation in engine torque,
- in examining the relationship between said given moment at which the disturbance is commanded and said detected moment that the variation in engine torque or said absence of variation in engine torque occurs, in order to deduce from this which phase of the engine cycle said reference cylinder was in when it passed through said determined position, and
- in recognizing the phase of all the cylinders of the engine on the basis of knowledge of the phase of the reference cylinder.

When the engine is equipped with an ignition system controlled individually per cylinder, the cylinders with the same TDC are commanded simultaneously from the moment the engine is started or from the time that an event liable to cause knowledge of the cylinder phase to be lost is detected and right up until the phase of the cylinders is recognized, and commanding the disturbance of the method of the invention advantageously consists in commanding a variation in the ignition command for the reference cylinder. This variation applied to the ignition command may consist in modifying the ignition energy and/or in modifying the moment of ignition, as compared with normal operation, that is to say normal ignition command. The change to the moment of ignition must be understood as meaning an increase or decrease in the ignition advance or retard, to be applied to operating scenarios in which the moment at which ignition is commanded is before or after the moment that the piston of the cylinder in question passes through TDC at the beginning of a combustion-expansion phase.

By contrast, if the engine is equipped with a fuel injection system controlled individually per cylinder, the method of the invention is advantageously such that commanding the disturbance consists in commanding a modification to the injection period for the reference cylinder, the expression “changing the injection period” having to be understood as meaning an increase or a decrease in this period, without however it being decreased so much that it completely cuts off injection.

Advantageously too, the method of the invention consists in observing the engine torque and in detecting its variations by observing and detecting variations in a signal that represents the value of the gas torque generated by each combustion in each of the cylinders of the engine.

As a preference, in this case, the method is used on an engine in which the rotary target is a ring gear integral with the flywheel or crankshaft of the engine, and whose teeth spread about its periphery constitute measurement marks, for which said position mark, which forms a unique feature on the ring gear constitutes a reference that indexes the measurement marks per flywheel or crankshaft revolution, the sensor which is fixed with respect to the engine being a sensor that senses the marks moving past it and which is mounted close to the ring gear so that it is advantageously possible, as known from FR-A-2 681 425, to deliver a signal that represents the gas torque on the basis of the period, speed and variation in speed at which the marks move past the sensor, thanks to the logic-type torque sensor described in the aforementioned patent.

To make it easier to determine the phase of the reference cylinder, the method advantageously consists in examining the relationship between the given moment of commanding a disturbance and the detected moment that the variation in engine torque or the absence of variation in engine torque occurs, by calculating the number of times that the piston of the reference cylinder passes through TDC between said two moments or starting from said given moment, and in comparing it with at least one pre-determined number that corresponds to a determined phase of the reference cylinder in the engine cycle, as the corresponding piston passes through said determined position.

The method of the invention may consist in carrying out at least one cycle of said phase recognition steps as soon as the engine is started, after at least the first time that the piston of the reference cylinder passes through said determined position or, on the contrary, in not carrying out at least one cycle of said phase recognition steps until after a predetermined whole number of engine cycles counted from the first time that the piston of the reference cylinder passes through said determined position, it furthermore being possible for the method to consist in repeating, fairly periodically, at least one cycle of said phase recognition steps in order to confirm or correct awareness of the phase of the cylinders.

BRIEF DESCRIPTION OF THE SEVERAL VIEWS OF THE DRAWINGS

Other advantages and features of the invention will emerge from the description given hereinbelow, without implied limitation, of the embodiments which are described with reference to the appended drawings in which.

DETAILED DESCRIPTION OF THE INVENTION

Figure 1:
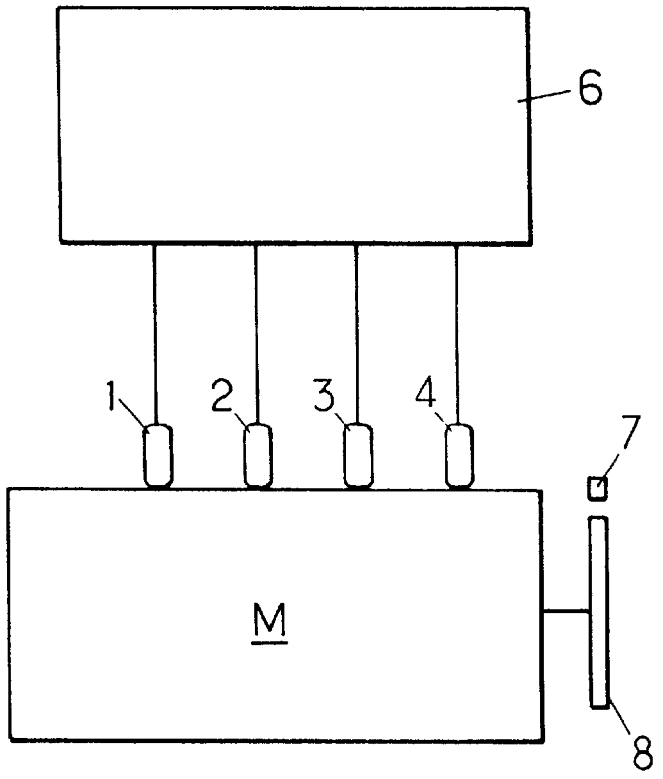
FIG. 1 is a diagrammatic view of a sequential ignition engine with its crank angle sensor.

In FIG. 1, a controlled-ignition four-stroke engine with four in-line cylinders is depicted diagrammatically as M. Ignition in the cylinders of the engine M is provided by four ignition coils 1, 2, 3 and 4, each of which corresponds to the cylinder (not depicted) with the same number of the engine M. The ignition coils 1, 2, 3 and 4 are powered sequentially with electric current, to provide ignition, by an electronic engine control unit 6 which in particular also controls the injection of fuel to the cylinders of the engine M. As is known, this engine control unit 6 in particular acts as a computer and contains one or more read-and-write memories, one or more read-only memories and at least one processing unit produced in the form of a microprocessor or microcontroller. The engine control unit 6 also has various input and output interfaces for, respectively, receiving input signals coming from the various sensors that sense operating parameters of the engine, so as to carry out operations, and delivering output signals intended in particular for the fuel injectors (not depicted) and the ignition coils 1, 2, 3 and 4.

Conventionally, a firing sequence for the cylinders is in the following order: 1, 3, 4, 2.

The input signals of the engine control unit 6 include pulses delivered by a variable-reluctance sensor 7 fixed to the block of the engine M and mounted facing and close to a ring gear 8 that rotates integrally with the flywheel. At its periphery, the ring gear 8 has uniformly spaced teeth 9 forming measurement marks, and a unique feature 10, which constitutes a mark for indexing the teeth 9 and a mark that identifies the crank angle of the engine and which, when it moves past the sensor 7, makes the latter deliver to the unit 6 a signal that indicates that the pistons of cylinders 1 and 4 are simultaneously passing through TDC. In the known way, the sensor 7 is also sensitive to the teeth 9 and 10 moving past it, so that it delivers pulses that are proportional to the frequency with which the teeth move past, which means that the unit 6 can formulate a signal regarding the rotational speed of the engine. In addition, and as explained hereinafter, the unit 6 can also formulate a signal that represents the gas torque generated, by each combustion in each of the cylinders of the engine M, on the basis of the pulses received from the sensor 7.

Ignition in the cylinders that pass simultaneously through TDC is commanded simultaneously from the moment the engine starts or from the detection of any event liable to bring about a loss of knowledge of the phase of the cylinders, until this phase is recognized using the method now described.

The method for recognizing or identifying the phase of the cylinders consists in carrying out at least one cycle of the following steps. As represented in FIG. 3*a*, when the engine control unit 6 receives the pulse 11 delivered by the sensor 7 and which corresponds to the pistons of cylinders 1 and 4 passing through TDC, the unit 6 simultaneously operates the coils 1 and 4 to cause ignition in cylinders 1 and 4 with disturbed ignition in coil 1 as compared with normal ignition, at the moment of the TDC signal 12 in FIG. 3*b*. This disturbed ignition in coil 1 may consist in altering the moment of ignition, that is to say increasing or reducing the ignition advance or retard normally calculated by the engine control unit 6 as a function of the engine operating conditions, or alternatively may consist in altering the ignition energy as compared with that normally defined by the unit 6. FIG. 3*c* represents a signal 13 formulated by the unit 6 and corresponding to a detected variation in the engine torque which occurs less than 2 TDCs after the moment the ignition 12 is altered in coil 1, but as a consequence of commanding this ignition disturbance, and this makes it possible to conclude that the variation in torque was generated in the cylinder 1 and therefore that the piston in cylinder 1 was at TDC at the beginning of a combustion-expansion phase at the moment when the unit 6 commanded the disturbance in ignition for this cylinder. The signal 13 that bears witness to the variation in engine torque as a consequence of the disturbance in ignition in coil 1 of one of the two cylinders whose pistons are at TDC at the moment of the disturbance is a signal formulated by the unit 6 on the basis of the observation and detection of variations in the gas torque. Therefore the unit 6 contains the device for measuring the torque of an internal combustion engine described in French Patent FR 2 681 425 and uses the method described in this patent, whose description is incorporated into this description as reference. This known device and this known method allow the formulation of a signal that represents the gas torque on the basis of the periods, speeds and variations in speed at which the teeth 9 of the ring gear 8 travel past the sensor 7. For further detail, reference can be made to French Patent FR 2 681 425, and it will merely be restated that the method according to this patent, to produce a value that represents the mean gas torque Cg generated by each combustion of the gaseous mixture in the cylinders of an internal combustion engine, the engine being of the kind comprising:

- measurement marks (the teeth 9) arranged on a ring gear 8 integral with the flywheel or the crankshaft;
- means (the unique feature 10) for defining a reference for indexing the marks (9) per flywheel or crankshaft revolution;
- a sensor 7 that senses the movement past it of the marks 9, mounted fixed close to the ring gear 8; comprises the following essential operations:
- the formulation of a primary value that represents the time taken $d_i$ for each of the marks 9 to move past the sensor 7;
- the processing of said primary value $d_i$ to produce two secondary values which respectively represent the mean angular velocity $\Omega_m$ of the marks 7 during a period of combustions in the engine M and the projection EcosΦ, onto the phase reference line of the marks relating to the angular combustion periods, of the alternating component E of instantaneous angular velocity $\Omega_i$ of the marks at the frequency of the combustions in the engine; and
- combining these two secondary values according to a relationship: $Cg=-a.\Omega_m.E\cos\Phi+b.\ \Omega_m^2$ to thus obtain the desired value, the terms a and b being empirically-determined constants.

As an alternative, the engine torque may be observed and its variation as the result of commanding disturbance in the ignition in cylinder 1, chosen to be the reference cylinder, may be detected, and the moment that this variation in engine torque occurs may be detected by observing and detecting variations in a gas torque signal represented by information of some nature other than that mentioned hereinabove, for example using signals relating to the pressure in the combustion chambers.

If, as represented in FIG. 3*d*, and by contrast with FIG. 3*c*, no engine torque variation signal is delivered through the monitoring of the change in gas torque signal, as a consequence of the ignition disturbance commanded in coil 1, this means that this ignition disturbance was commanded when the piston in cylinder 1 was at TDC at the beginning of an induction phase, and therefore that the piston in cylinder 4, which was at TDC at the same time, was at the beginning of a combustion-expansion phase.

From this deduction, which results from examining the relationship between the moment that the signal 13 relating to the occurrence of the variation in engine torque was detected and the moment when the disturbed ignition 12 was commanded, the phase of cylinders 1 and 4 then that of cylinders 2 and 3 can be deduced.

This examination of the relationship between the moment that the ignition disturbance is commanded and the moment that its consequence on engine torque is detected can be achieved by comparing the number of TDCs between these two moments against a predetermined threshold number, for example 2 TDCs, so that if the signal 13 of variation in engine torque is detected less than two TDCs after the signal commanding the disturbance in ignition 12, as is the case in FIG. 3*c*, it can be deduced therefrom that the cylinder 1 was in the combustion-expansion phase, whereas if the number of TDCs that elapse after the disturbance 12 is commanded exceeds 2 before a variation in engine torque is detected, as shown in FIG. 3*d*, it can be deduced from this that the cylinder 1 was in the induction phase.

To avoid any ambiguity in the relationship between commanding a disturbance in the ignition in the coil and its consequence on the variation in engine torque, the disturbance is commanded on the coil of the reference cylinder for a complete engine cycle.

One or more consecutive cycles of the phase recognition steps described hereinabove can be carried out as soon as the engine is started, for example after the piston in cylinder 1 passes for the first time or for the first few times through TDC.

As an alternative, the cycle of phase recognition steps may be carried out after the phase of starting up the engine, that is to say after a predetermined whole number of engine cycles, this number being counted, for example, starting from the first time that the piston in cylinder 1 passes through TDC.

It is also possible, after at least one cycle of the phase recognition steps carried out as soon as the engine is started, for further cycles of these recognition steps to be repeated fairly periodically after engine-start-up so as to confirm or correct knowledge of the phase of the cylinders resulting from the previous cycle or cycles of recognition steps.

Figure 4:
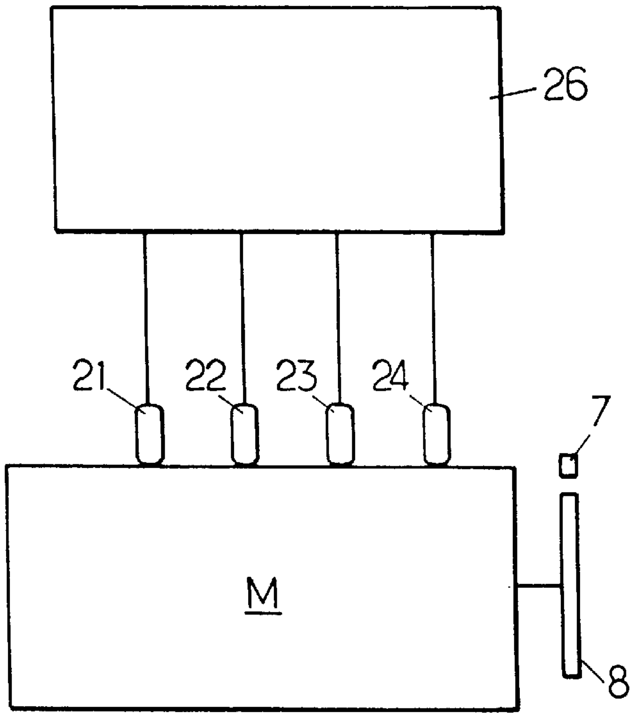

In FIG. 4, the engine M differs from the engine of FIG. 1 only in that instead of a sequential ignition system it comprises a sequential multi-point fuel injection system by means of which each of the cylinders 1 to 4 of the engine M is supplied with fuel by a corresponding injector 21, 22, 23 or 24 controlled by the engine control unit 26, similar to the unit 6 in FIG. 1, and which also controls ignition, in any appropriate way. Like the unit 6, the engine control unit 26 also formulates an engine rotational speed signal, a signal that the pistons of cylinders 1 and 4 are passing through TDC, and a signal that represents the gas torque from pulses it receives from the sensor 7, fixed, like in the previous example, to the engine M and able to detect the teeth 9 and the unique feature 10 of the ring gear 8 that rotates with the crankshaft travelling past it, under the same conditions as explained hereinabove. The engine control unit 26 therefore also contains the device for measuring the torque of an internal combustion engine that is the subject matter of French Patent FR 2 681 425 and uses the method described in this patent.

As is known, the unit 26 sequentially controls the moments at which the injectors 21, 22, 23 and 24 open and the open periods of these injectors so that metered amounts of fuel can be injected as a function of the operating conditions of the engine M.

In this example, the phase recognition method comprises the following steps: first of all, on receipt of the signal 31 of FIG. 6*a*, which corresponds to the unique feature 10 moving past the sensor 7, and which indicates the pistons of cylinders 1 and 4 passing through TDC, a disturbance in the control of the corresponding injector 21 is commanded, for cylinder 1 which is chosen to be the reference cylinder, this disturbance consisting in an increase or decrease in the injection period, without this being able to completely cut off the injection. At the same time, the engine control unit 26 commands static twin ignition in cylinders 1 and 4. The engine torque is then observed to detect its variation as a result of the commanding of the injection disturbance referenced as 32 in FIG. 6*b*, and the moment that this variation in engine torque occurred, as indicated by the gas torque variation signal 33 of FIG. 6*c*, obtained less than 2 TDCs after the injection disturbance was commanded on injector 21 is detected if the piston in cylinder 1 was at TDC in an induction phase when the injection disturbance was commanded. By contrast, if the variation in engine torque corresponding to the signal 34 indicating a variation in gas torque in FIG. 6*d* is not detected until after 2 TDCs after the injection disturbance was commanded 32 in injector 21, this indicates that the phase in cylinder 1 at TDC when the injection disturbance was commanded was a combustion-expansion phase rather than an induction phase.

In this example too, examining the relationship between the given moment at which the disturbance was commanded and the detected moment that the variation in engine torque occurred, through the variation in gas torque, is achieved by calculating the number of times the piston of the reference cylinder passes through TDC between the two moments, and by comparing this number with at least one predetermined threshold number in order to deduce from this the phase of the reference cylinder as it first passed through TDC in question and to know the phase of all the cylinders.

As in the previous example, all the cylinders of the engine can have their phase identified from knowledge of the phase of the reference cylinder, and the injection disturbance on injector 21 can be commanded during a complete engine cycle. A phase recognition cycle can be carried out as soon as the engine is started, or a certain number of engine cycles after this starting, and may possibly be repeated fairly periodically to confirm or correct the knowledge of the phase of the cylinders resulting from a prior phase-recognition cycle.

Figure 2:
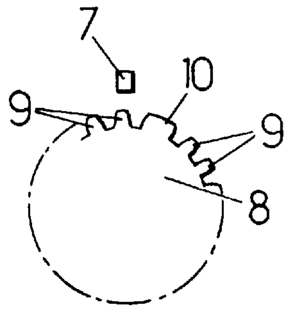
FIG. 2 is a diagrammatic side elevation of the crank angle sensor of the engine of FIG. 1, FIGS. 3*a*, 3*b*, 3*c*, 3*d* are superimposed timing diagrams that respectively represent the signal from the sensor of FIGS. 1 and 2, the signals of the various pistons of the engine passing through TDC, and two possible detections of variation in engine torque following a change in ignition on one of the cylinders of the engine, and FIGS. 4, 5 and 6*a* to 6*d* correspond respectively to FIGS. 1, 2 and 3*a* to 3*d* for an engine with sequential injection, FIGS. 6*c* and 6*d* representing two possible detections of variation in engine torque following a disturbance in the injection for one of the engine cylinders.
Figure 3:
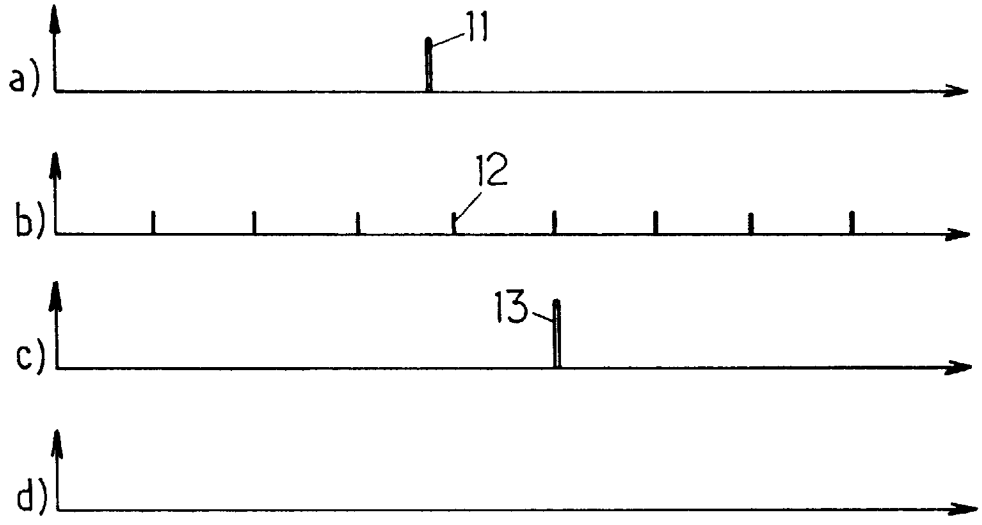
Figure 5:
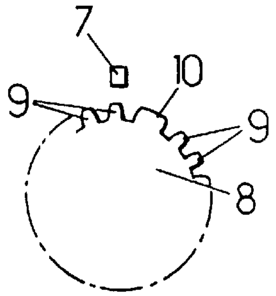
Figure 6:
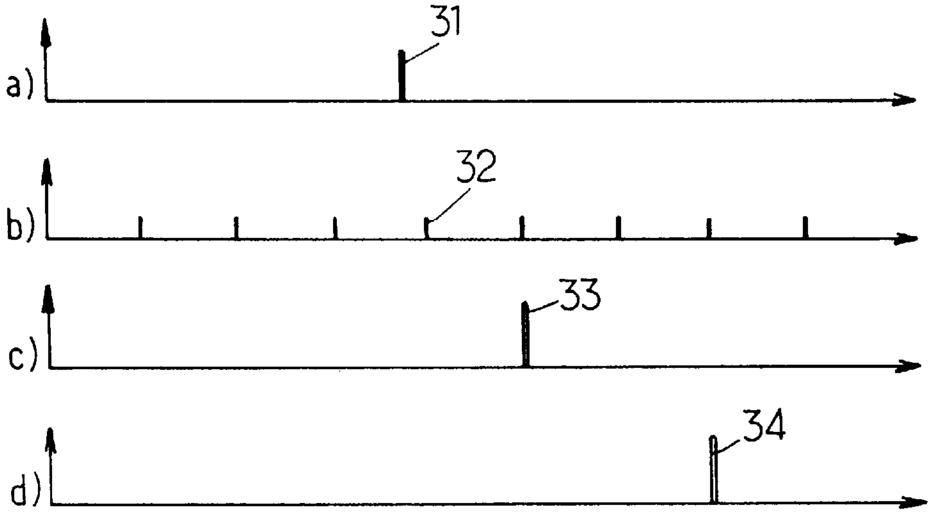

It is obvious that the example of FIGS. 1 to 3 can be applied to an engine equipped with an ignition system controlled individually per cylinder, independently of the type of its injection system, just like the example of FIGS. 4 to 6 can be applied to an engine equipped with a fuel injection system controlled individually per cylinder, independently of the type of its ignition control system.

However, the method of the invention is advantageously applied to engines in which the ignition and injection systems are of the sequential type.

Finally, it should be noted that the phase recognition method described with reference to FIGS. 4 to 6 can be used on a diesel engine, the disturbance command relating only to the injection of fuel into the selected reference cylinder.

I claim:

1. A method for recognizing a phase of cylinders of a multi-cylinder four-stroke internal combustion engine equipped with at least one of an ignition system and a fuel injection system, said at least one an ignition system and a fuel system controlled individually for each cylinder and comprising a sensor for supplying a signal wherein identifying that a piston of a reference cylinder of the engine is passing through a determined position is possible, said method comprising at least one cycle of steps comprising:

commanding, on a reference cylinder and at a given moment that is associated with a piston of said reference cylinder passing through a determined position, a disturbance causing variation in engine operation;

observing the engine operation and detecting a variation in engine operation as a result of said commanding for said disturbance on said reference cylinder, and detecting one of the moment at which said variation in engine operation occurs and an absence of variation in engine operation;

examining a relationship between said given moment of commanding said disturbance and said detecting one of the moment that the variation in engine operation occurs and said absence of variation in engine operation occurs, in order to deduce which phase of engine cycle said reference cylinder was in as a phase of said reference cylinder when said reference cylinder passed through said determined position; and recognizing a phase of all cylinders of the engine on a basis of knowledge of said phase of said reference cylinder, wherein said commanding said disturbance comprises commanding a modification to at least one of ignition energy and injection period as compared with normal operation, other than completely stopping ignition command and injection command, and wherein said detecting any variation in engine operation as a result of said commanding comprises detecting any variation in engine torque and a moment that said variation in engine torque occurred.

2. The method according to claim 1, wherein cylinders with substantially the same top dead center are commanded substantially simultaneously from a condition selected from the group consisting of when the engine is started, a time that an event liable to cause knowledge of a cylinder phase to be lost is detected, and right up until the phase of the cylinders is recognized.

3. The method according to claim 1, comprising observing engine torque and detecting variations in engine torque by observing and detecting variations in a signal that represents a value of gas torque generated by each combustion in each cylinder of the engine.

4. The method according to claim 3, for an engine in which a rotary target comprises a ring gear integral with at least one of a ring gear flywheel and a crankshaft of the engine, and including teeth spread about a periphery comprising measurement marks, for which a position mark comprising a feature on the ring gear, comprises a reference that indexes said measurement marks per revolution of said at least one of said flywheel and said crankshaft, wherein said sensor is fixed on the engine and comprises a sensor that senses said measurement marks moving past said sensor and which is mounted close to said ring gear, said method comprising delivering a signal that represents gas torque on a basis of at least one member selected from the group consisting of periods, speeds and variations in speed at which said measurement marks move past said sensor.

5. The method according to claim 1, comprising examining a relationship between said given moment of commanding a disturbance and said detecting one of the moment that the variation in engine operation occurs and said absence of variation in engine operation occurs by a procedure selected from the group consisting of calculating a number of times that the piston of the reference cylinder passes through TDC between said given moment and said detected moment, and starting from said given moment, comparing said given moment with at least one predetermined number that corresponds to a determined phase of the reference cylinder in the engine cycle, as the corresponding piston passes through said determined position.

6. The method according to claim 1, comprising carrying out at least one cycle of phase recognition steps substantially as soon as the engine is started after said piston of said reference cylinder passes through said determined position at least a first time.

7. The method according to claim 1, comprising delaying carrying out at least one cycle of phase recognition steps until after a predetermined whole number of engine cycles counted from a first time that said piston of said reference cylinder passes through said determined position.

8. The method according to claim 1, comprising repeating at least one cycle of phase recognition steps in order to determine a condition selected from the group consisting of confirming a phase of the cylinders and correcting awareness of a phase of the cylinders.

9. The method according to claim 1, comprising commanding said disturbance on said reference cylinder during an engine cycle.

* * * * *